J. P. Whipple.
Lathe Tool.
No. 94,159.   Patented Aug. 24, 1869.

Witnesses
J. W. Coombs
Fred Haynes

Inventor
J. P. Whipple
per Brown Coombs

UNITED STATES PATENT OFFICE.

JOHN P. WHIPPLE, OF WOONSOCKET, RHODE ISLAND.

Letters Patent No. 94,159, dated August 24, 1869.

IMPROVED TURNING-TOOL.

The Schedule referred to in these Letters Patent and making part of the same.

To all whom it may concern:

Be it known that I, JOHN P. WHIPPLE, of Woonsocket, in the county of Providence, and State of Rhode Island, have invented a new and useful Improvement in Tools for Lathe and other work, of which the following is a full, clear, and exact description, reference being had to the accompanying drawing, forming part of this specification, and in which—

Figure 1:
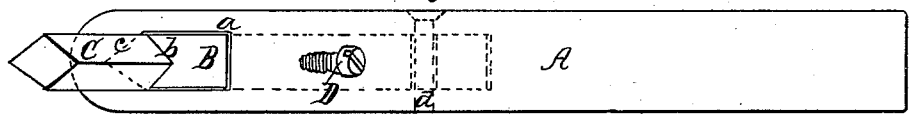
Figure 2:
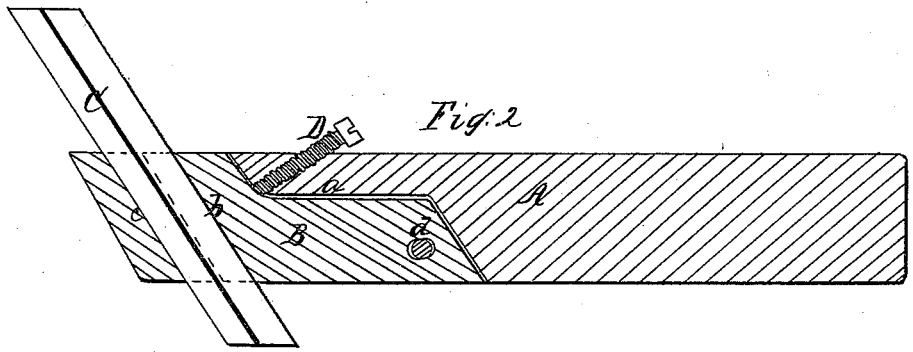

Figure 1 represents a top view of a tool or tool-holder, with cutting-tool therein, constructed in accordance with my improvement; and Figure 2, a longitudinal central section of the same, at right angles to fig. 1.

Similar letters of reference indicate corresponding parts.

My invention consists in a tool for lathe and other work, which is made up of a slotted stock, a clamp pivoted therein, and a set-screw, for operating or releasing the clamp, to effect its hold on or release of the cutter, and whereby steadiness of grip, with great facility for putting in and taking out the cutter, is secured.

Referring to the accompanying drawing—

A is the stock of the tool, made with a recess or slot, $a$, in and through it, to receive within it a clamp, B, and cutting-tool, C, which latter projects obliquely through the stock, and is held between the forward end of the slot and front end or face of the clamp, said ends also occupying an oblique position relatively to the stock.

The front end or face of the clamp may be constructed to form an angular groove, $b$, and the front end of the slot a reversely-angular groove, $c$, to accommodate or grip in between them a cutting-tool, of square shape in its transverse section, or made to hold equally firm a round, octagonal, or other polygonal-shaped cutter.

The clamp B is pivoted to the stock, below or in the rear, as by a pin or screw, $d$, but, preferably, a screw, to facilitate the removal of one clamp and insertion of another better adapted to hold a cutting-tool of different size or shape; and as it is difficult or impossible to make duplicate cutting-tools of exactly the same dimensions, it is desirable that the hole or holes through which the screw $d$ passes, should be slightly larger than is necessary, merely to secure freedom in turning, so that the clamp may adjust itself to any irregularity.

D is a set-screw, arranged to pass through the upper side of the slotted portion of the stock, and to bear upon the back of the clamp, at or near the middle of the cutting-tool, to which latter said screw is set to occupy a position at right angles, or thereabout.

This screw serves to adjust the pivoted clamp to, or to release it from hold on the cutting-tool, as required.

A tool thus constructed may be used either for turning or planing-purposes, by setting the cutter at different angles, and combines steadiness of grip with the greatest facility as regards dispatch, for putting in and taking out the cutter, or adjusting it through the stock or holder.

What is here claimed, and desired to be secured by Letters Patent, is—

The combination, with the stock A, of the pivoted clamp B, arranged within a slot made through the stock, and controlled by a set-screw, D, to effect its hold on or release of the cutter C, substantially as specified.

JOHN P. WHIPPLE.

Witnesses:
HARLEY W. BENNETT,
FRANCIS WHIPPLE.